US008626863B2

(12) United States Patent
Huang et al.

(10) Patent No.: US 8,626,863 B2
(45) Date of Patent: Jan. 7, 2014

(54) PERSISTENT SYNTHETIC ENVIRONMENT MESSAGE NOTIFICATION

(75) Inventors: Peter Chi-Hao Huang, Menlo Park, CA (US); Erin Turner, San Francisco, CA (US)

(73) Assignee: Trion Worlds, Inc., Redwood City, CA (US)

( * ) Notice: Subject to any disclaimer, the term of this patent is extended or adjusted under 35 U.S.C. 154(b) by 237 days.

(21) Appl. No.: 12/259,902

(22) Filed: Oct. 28, 2008

(65) Prior Publication Data

US 2010/0106782 A1    Apr. 29, 2010

(51) Int. Cl.
*G06F 15/16* (2006.01)

(52) U.S. Cl.
USPC .......................................... 709/207; 709/206

(58) Field of Classification Search
USPC .................................................. 709/206, 207
See application file for complete search history.

(56) References Cited

U.S. PATENT DOCUMENTS

| | | | |
|---|---|---|---|
| 5,819,034 A | 10/1998 | Joseph et al. | |
| 5,851,149 A | 12/1998 | Xidos et al. | |
| 5,915,090 A | 6/1999 | Joseph et al. | |
| 5,987,466 A | 11/1999 | Greer et al. | |
| 6,015,348 A | 1/2000 | Lambright et al. | |
| 6,052,455 A | 4/2000 | James | |
| 6,175,842 B1 | 1/2001 | Kirk et al. | |
| 6,253,367 B1 | 6/2001 | Tran et al. | |
| 6,751,212 B1 | 6/2004 | Kaji et al. | |
| 6,757,696 B2 | 6/2004 | Multer et al. | |
| 6,816,787 B2 | 11/2004 | Ramamoorthy et al. | |
| 6,883,168 B1 | 4/2005 | James et al. | |
| 6,892,230 B1 | 5/2005 | Gu et al. | |
| 7,168,035 B1 | 1/2007 | Bell et al. | |
| 7,373,377 B2 | 5/2008 | Altieri | |
| 7,471,947 B1 | 12/2008 | Papineu | |
| 7,502,843 B2 | 3/2009 | Kirstein et al. | |
| 7,818,077 B2 | 10/2010 | Bailey | |
| 8,026,918 B1 * | 9/2011 | Murphy | 345/473 |
| 2003/0058238 A1 | 3/2003 | Doak et al. | |
| 2003/0108022 A1 | 6/2003 | Yamamoto | |
| 2003/0167305 A1 | 9/2003 | Zhu et al. | |
| 2003/0177187 A1 | 9/2003 | Levine et al. | |
| 2004/0076178 A1 | 4/2004 | Botton | |
| 2004/0103141 A1 | 5/2004 | Miller et al. | |

(Continued)

FOREIGN PATENT DOCUMENTS

| | | |
|---|---|---|
| EP | 0680182 | 11/1995 |
| RU | 2236702 | 9/2004 |
| WO | 2008109132 | 9/2008 |

OTHER PUBLICATIONS

Engtech. "How to Get an RSS Feed for your XBOX 360 Gamertag" Mar. 31, 2008. pp. 1-7.*

(Continued)

*Primary Examiner* — Imad Hussain
(74) *Attorney, Agent, or Firm* — Van Pelt, Yi & James LLP

(57) ABSTRACT

Persistent synthetic environment message notification is described, including retrieving synthetic environmental data associated with an event occurring within a synthetic environment, identifying one or more formats to configure the synthetic environmental data and to transmit the synthetic environmental data, generating a message comprising the synthetic environmental data, the message being generated based on at least one of the one or more formats, and sending the message comprising the synthetic environmental data to an endpoint.

37 Claims, 12 Drawing Sheets

(56) References Cited

U.S. PATENT DOCUMENTS

| | | | |
|---|---|---|---|
| 2004/0193441 A1 | 9/2004 | Altieri | |
| 2005/0068167 A1 | 3/2005 | Boyer et al. | |
| 2005/0193120 A1 | 9/2005 | Taylor | |
| 2005/0209002 A1 | 9/2005 | Blythe et al. | |
| 2005/0272492 A1 | 12/2005 | Stelly | |
| 2006/0014585 A1 | 1/2006 | Neogi | |
| 2006/0135259 A1* | 6/2006 | Nancke-Krogh et al. | 463/42 |
| 2006/0146848 A1 | 7/2006 | Kirstein et al. | |
| 2006/0274784 A1 | 12/2006 | Hsueh et al. | |
| 2006/0287096 A1* | 12/2006 | O'Kelley et al. | 463/42 |
| 2007/0117630 A1* | 5/2007 | Fowler et al. | 463/42 |
| 2007/0130150 A1* | 6/2007 | Fowler et al. | 707/10 |
| 2007/0173327 A1* | 7/2007 | Kilgore et al. | 463/42 |
| 2007/0191103 A1 | 8/2007 | Van Luchene | |
| 2007/0218987 A1* | 9/2007 | Van Luchene et al. | 463/30 |
| 2007/0265091 A1* | 11/2007 | Aguilar et al. | 463/42 |
| 2008/0009345 A1* | 1/2008 | Bailey et al. | 463/29 |
| 2008/0026845 A1 | 1/2008 | Aguilar et al. | |
| 2008/0026847 A1* | 1/2008 | Mueller et al. | 463/42 |
| 2008/0090659 A1* | 4/2008 | Aguilar et al. | 463/42 |
| 2008/0176655 A1 | 7/2008 | James et al. | |
| 2008/0207327 A1* | 8/2008 | Van Luchene et al. | 463/42 |
| 2008/0220873 A1 | 9/2008 | Lee et al. | |
| 2008/0294417 A1* | 11/2008 | Brunstetter et al. | 703/21 |
| 2008/0294782 A1* | 11/2008 | Patterson | 709/227 |
| 2009/0006566 A1* | 1/2009 | Veeramachaneni et al. | 709/206 |
| 2009/0017916 A1* | 1/2009 | Blanchard et al. | 463/42 |
| 2009/0055369 A1 | 2/2009 | Phillips et al. | |
| 2009/0089439 A1 | 4/2009 | Benco et al. | |
| 2009/0111576 A1* | 4/2009 | Ostergren et al. | 463/29 |
| 2009/0125481 A1 | 5/2009 | Mendes da Costa et al. | |
| 2009/0131177 A1* | 5/2009 | Pearce | 463/43 |
| 2009/0176557 A1* | 7/2009 | Hall et al. | 463/25 |
| 2009/0199275 A1 | 8/2009 | Brock et al. | |
| 2009/0209335 A1* | 8/2009 | Pearce | 463/30 |
| 2009/0215433 A1* | 8/2009 | Cavanaugh et al. | 455/414.1 |
| 2009/0231112 A1 | 9/2009 | Baalbergen et al. | |
| 2009/0235176 A1 | 9/2009 | Jayanthi | |
| 2009/0239556 A1 | 9/2009 | Sennett et al. | |
| 2009/0253494 A1* | 10/2009 | Fitch et al. | 463/25 |
| 2009/0287640 A1 | 11/2009 | Hamilton et al. | |
| 2009/0300525 A1* | 12/2009 | Jolliff et al. | 715/764 |
| 2009/0319668 A1 | 12/2009 | Hamilton et al. | |
| 2009/0325712 A1 | 12/2009 | Rance | |
| 2010/0009703 A1 | 1/2010 | Sornay | |
| 2010/0203936 A1 | 8/2010 | Levy et al. | |
| 2010/0251330 A1 | 9/2010 | Kroeselberg et al. | |
| 2010/0255916 A1 | 10/2010 | Sioufi Filho | |
| 2010/0274914 A1 | 10/2010 | Birch et al. | |
| 2010/0299615 A1 | 11/2010 | Miluzzo et al. | |
| 2011/0041153 A1* | 2/2011 | Simon et al. | 725/46 |
| 2012/0079046 A1* | 3/2012 | Murphy | 709/206 |
| 2012/0084364 A1* | 4/2012 | Sivavakeesar | 709/205 |
| 2013/0133087 A1* | 5/2013 | Proctor et al. | 726/28 |

OTHER PUBLICATIONS

Mackenzie, Duncan. "Connect your Xbox 360 Gamertag to Twitter" May 11, 2007. pp. 1-5.*

PsychoStats. "PsychoStats" Oct. 11, 2007. pp. 1-2.*

Blizzard. "The Armory" Oct. 2, 2007. pp. 1-3.*

International Search Report and Written Opinion for PCT/US2008/003055, Aug. 11, 2008.

International Search Report and Written Opinion for PCT/US2008/003000, Jun. 26, 2008.

Roger McFarlane, Network Software Architectures for Real-Time Massively-Multiplayer Online Games, Feb. 2, 2005.

Kuester et al., Virtual Explorer: A Plugin-Based Virtual Reality Framework, SPIE Proceedings, The International Society for Optical Engineering, vol. 4297, Jan. 22, 2001.

* cited by examiner

PERSISTENT SYNTHETIC ENVIRONMENT MESSAGE NOTIFICATION

FIELD

The present invention relates generally to software, computer program architecture, and data network communications. More specifically, techniques for persistent synthetic environment message notification are described.

BACKGROUND

In conventional computer or online gaming, characters are typically created by users for interaction with a virtual world or game. Establish accounts, users (i.e., players or person playing a game, whether a PC/desktop, online, massively multiplayer online (e.g., MMO), or console game) typically specify preferences, criteria, rules, characteristics, or other parameters associated with a character, its appearance, capabilities, and other aspects of game play. As characters interact within a game, various activities and events typically occur. During game play or within a game environment, users often interact with each other by creating lists of other characters or other users, often communicating using chat or another messaging feature deployed in the game environment. However, conventional solutions are limited, often restricting the type and amount of information, and the manner in which the information is shared with other players.

In some conventional solutions, massively multi-player online games (i.e., MMOG, MMO, MMORPG (i.e., massively multiplayer online role playing games)) typically allow users to communicate with each other, often using messaging techniques deployed within a game environment or implemented for use within a game environment using one or more specialized servers to provide communication capabilities. However, conventional solutions face a constant challenge in attempting to entice additional users to enroll and play a particular game, engage in social networks within a game environment, or allow limited types of information to be shared among users. Further, conventional solutions (i.e., games and gaming applications) often prevent users from sharing game, character, or other related data or information outside of a game environment, often requiring users to be logged into the game environment. Typically, when users are logged into a game environment, conventional solutions are not configured to allow observation of another user's activities or events affecting other users (e.g., a battle occurring in another part of a virtual world of a game that may not involve both users). Still further, conventional games and gaming applications allow game data to be used only within a particular title or game, preventing the use of game data with other applications.

In some conventional solutions, in-game data such as combat logs, inventory lists, character, and game performance data offer features that allow users to observe another user's actions or view another user's character information, but only when the observing user is logged into the game environment. In other conventional solutions, users must affirmatively and manually "push" game status, statistics, level, avatar, or character information to other users. Further, conventional solutions allow basic types of information to be sent only after being manually retrieved by a user. Alternatively, conventional "pull" solutions for retrieving game data and information must be performed by accessing different sources, typically requiring users to log into a game or gaming application, retrieve desired data, configure rules, filters, preferences, or other parameters. Further, conventional solutions such as MMO games and gaming applications are technically limiting and unable to provide real-time (i.e., game-time) data or information and do not support sending game data outside of the game environment.

Despite these limitations, conventional games and gaming applications are becoming increasingly popular and users are sharing information associated with events and activities affecting their characters using conventional social networking applications and websites ("sites"). However, using conventional social networking applications to share game-related events and activities is labor-intensive, time-consuming, and provides the ability to view static, time-late information. As a conventional example, a user shares her character's experiences during a battle within a game environment by manually capturing or recording a segment of animation and posts (i.e., uploads, stores, and configures for access by others), pasting it into an email, or posting it to a social networking website, all of which are time-consuming and labor-intensive. By sending email, IM, chat, or other types of messages to other users, the user is able to invite other users to view the posted content. However, the content is created, posted, and configured through time, labor, and expertise-intensive user efforts, which reduces the appeal of games and gaming applications and, subsequently, limits commercial success and revenue potential.

Thus, what is needed is a solution for sharing game data or information without the limitations of conventional techniques.

BRIEF DESCRIPTION OF THE DRAWINGS

Various embodiments of the invention are disclosed in the following detailed description and the accompanying drawings.

DETAILED DESCRIPTION

Figure 1A:
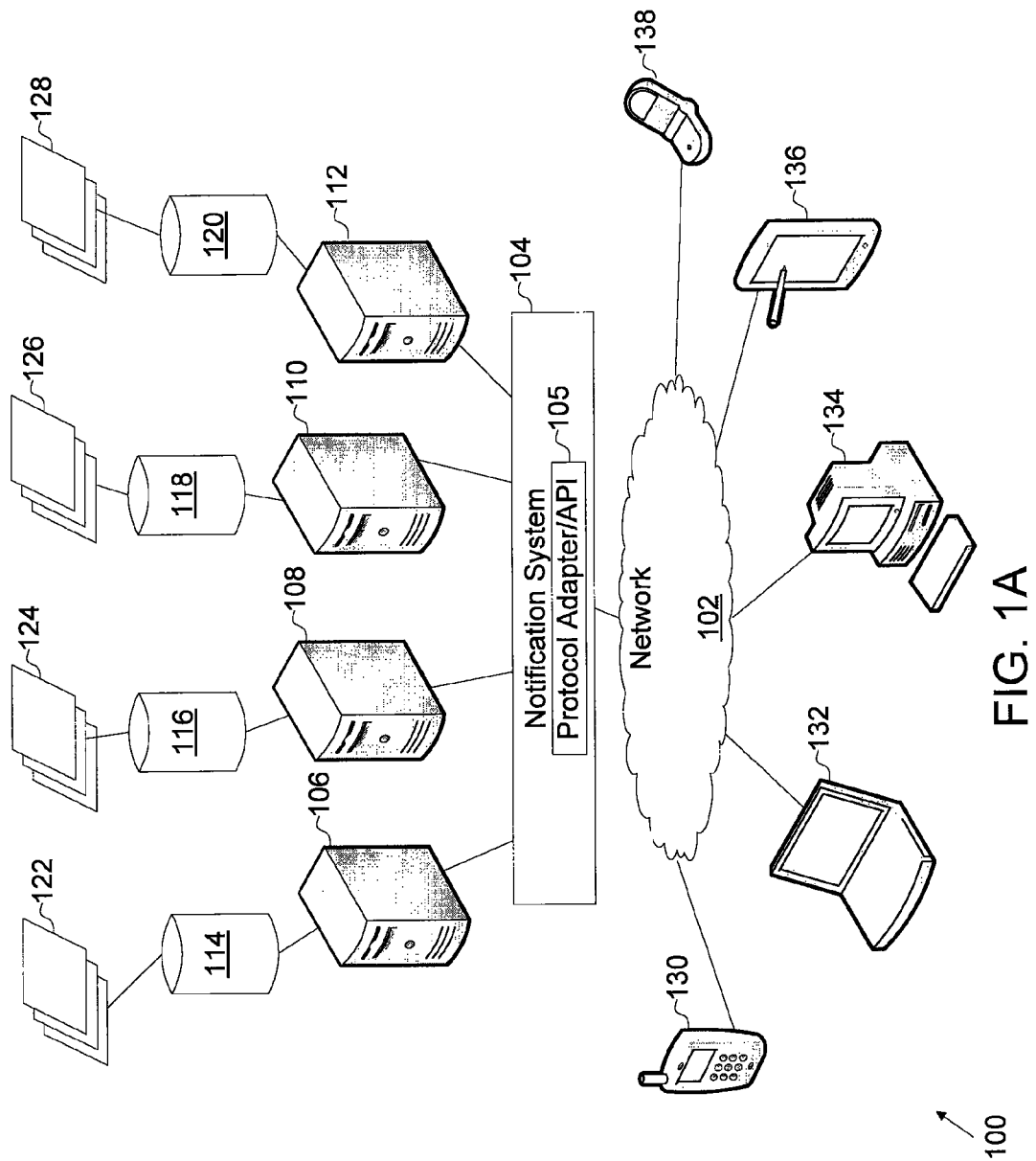
FIG. 1A illustrates an exemplary persistent synthetic environment message notification system.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Adobe® Integrated Runtime™ (Adobe®) AIR™), ActionScript™, Flex™, Lingo™, Java™, Javascript™, Ajax, Perl, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Techniques for persistent synthetic environment message notification are described, including retrieving dynamic content (e.g., content, data, or information generated from game play or character interaction with a synthetic environment (i.e., virtual world) in real time) and generating messages in various output formats ("formats") for receipt by end devices, such as mobile phones, smart phones, personal digital assistants (PDAs), desktop computers, servers, notebooks, or other data communication device, without limitation. In some examples, a persistent synthetic environment may be a virtual world, game, or other simulated environment that, when implemented, provides a continuous forum for various purposes (e.g., gaming, combat simulation, social networking, community or world development, and others) in which users may interact with various aspects, features, activities, and events using characters and avatars. The described techniques may be used to generate message notifications or messages ("messages") that may be transmitted between shards (i.e., server-based instances of a synthetic environment (i.e., virtual world, which may be persistent or otherwise), which may be used as copies to implement the synthetic environment), game platforms or titles (i.e., regardless of whether supported by a single game platform or implementation (e.g., console, MMO, MMORPG, MMOG, PC, desktop, and others)), or across various types of data communication interfaces (e.g., application programming interface ("API"), which may be configured for communicating data and information between a synthetic environment and another application, operating system, or operating system). In some examples, data and information associated with a synthetic environment may be retrieved from one or more sources in real-time or substantially real-time and transmitted to other in-game (i.e., other accounts associated with a given synthetic environment, virtual world, or game) end devices, nodes, or recipients ("end devices"). In other examples, data and information associated with a synthetic environment, character, account, avatar, character, or any other aspect of a synthetic environment may be transmitted to end devices (e.g., mobile phone, smart phone, PDA, mobile computing device, desktop computer, notebook computer, server, computing network, or any other type of client, server, node, terminal, or other networking element) configured to receive data inside or outside of a synthetic environment on the Internet, World Wide Web ("web"), or other data network. In other words, a user does not need to be logged into an account within a game, virtual, or synthetic environment in order to receive data associated with the synthetic environment. The described techniques may be varied in design, function, implementation, order, configuration, layout, format, or other technical aspects and are not limited to the examples provided.

FIG. 1A illustrates an exemplary persistent synthetic environment message notification system. Here, system 100 includes network 102, message notification system 104 (including protocol adapter/API 105), servers 106-112, databases 114-120, storing data 122-128, and end devices 130-138. The quantity, type, function, capabilities, and other aspects of the elements shown in system 100 may be varied and are not limited to any examples shown or described. In some examples, servers 106-112 may be implemented in data communication with databases 114-120 and, using data 122-128, shards of a synthetic environment may be implemented using processes provided by each set (e.g., server 106 being in data communication with database 114 using data 122, server 108 being in data communication with database 116 using data 124, server 110 being in data communication with database 118 using data 126, server 112 being in data communication with server 120 using data 128, and the like). As an example message notification system 104, including protocol adapter/API 106, may be implemented on one or more of servers 106-112. Configuring data 122-128 retrieved from one or more of servers 106-112, message notification system 104 may be implemented to generate messages (i.e., message notifications) to one or more of end devices 130-138.

For example, data 126 may include data associated with a synthetic environment that indicates the inventory, allocation, status, and capabilities associated with a given character's weapons. Using inputs provided to message notification system 104 from any of clients 130-138 or servers 106-112, messages may be generated using data 126 and transmitted (i.e., sent) to any of clients 130-138, regardless of whether the end device is logged into the synthetic environment using, for example, a web browser, an application browser, or the like. As another example, data 122 and data 128 may include data associated characters interacting with different regions of a synthetic environment (i.e., virtual world) implemented using different shards. Message notification system 104 may be configured to generate messages to send to end devices 130-138 to allow users to view the actions, activities, performance, statistics, characteristics, attributes, events, or the like associated with another user. Further, message notification system 130-138 may draw upon dynamic content produced in real-time by a synthetic environment implemented by one or more shards (i.e., server 106 being in data communication with database 114 using data 122, server 108 being in data communication with database 116 using data 124, server 110 being in data communication with database 118 using data 126, server 112 being in data communication with server 120 using data 128, and the like). Using multi-threading and load-balancing techniques, without limitation to any given technique, large volumes of data may be used to produce real-time "feeds" or messages being generated and sent to end devices 130-138. As described, messages may be generated using a variety of techniques, protocols, and formats.

Here, messages may be generated by message notification system 104 using protocol adapter/API 105 to implement messages in various types of protocols and formats (e.g., TCP/IP, UDP, WAP/WML, SMTP, Brew®, Java, JavaScript®, RSS, Atom, HTML, XML, DHTML, and others, without limitation). In some examples, protocol adapter/API 105 may be a single adapter engine that is configured to translate data 122-128 from one format to another format. For example, data 122-128 may be stored as XML-formatted data in databases 114-120 and, when retrieved by one or more of servers 106-112, provided to message notification system 104. Subsequently, protocol adapter/API 105 transforms the XML-formatted data retrieved from databases 114-120 into a message transmitted as an RSS-based character feed (i.e., a data or information feed that is related to a given character, which may be that of another user, set of users (e.g., a group of users, community of users, a guild, party, team, unit, fire team, squad, platoon, company, battalion, regiment, regimental combat team, brigade, brigade combat team, division, army, and the like) to end device 130 (e.g., a web-enabled mobile phone). Thus, a user of end device 130 may be able to view data produced from a synthetic environment (e.g., the weapon status of another user) in real-time on a device that may be web-enabled, but which is not used to log in to the synthetic environment. Messages may be generated and sent to end devices 130-138, regardless of whether they are logged in or out of the synthetic environment. In other words, users may view real-time synthetic environmental data (i.e., data associated with any aspect, feature, character, or attribute of a synthetic environment (e.g., MMO, MMOG, MMORPG, online game, console game, and others)), whether received as an RSS-feed, an email, an instant message using any of various types of instant messaging systems, or a web-based alert that appears as, for example, a pop-up window in a micro-browser provided on device 130. In other examples, messages may be generated differently and are not limited to the techniques shown and described.

Figure 1B:
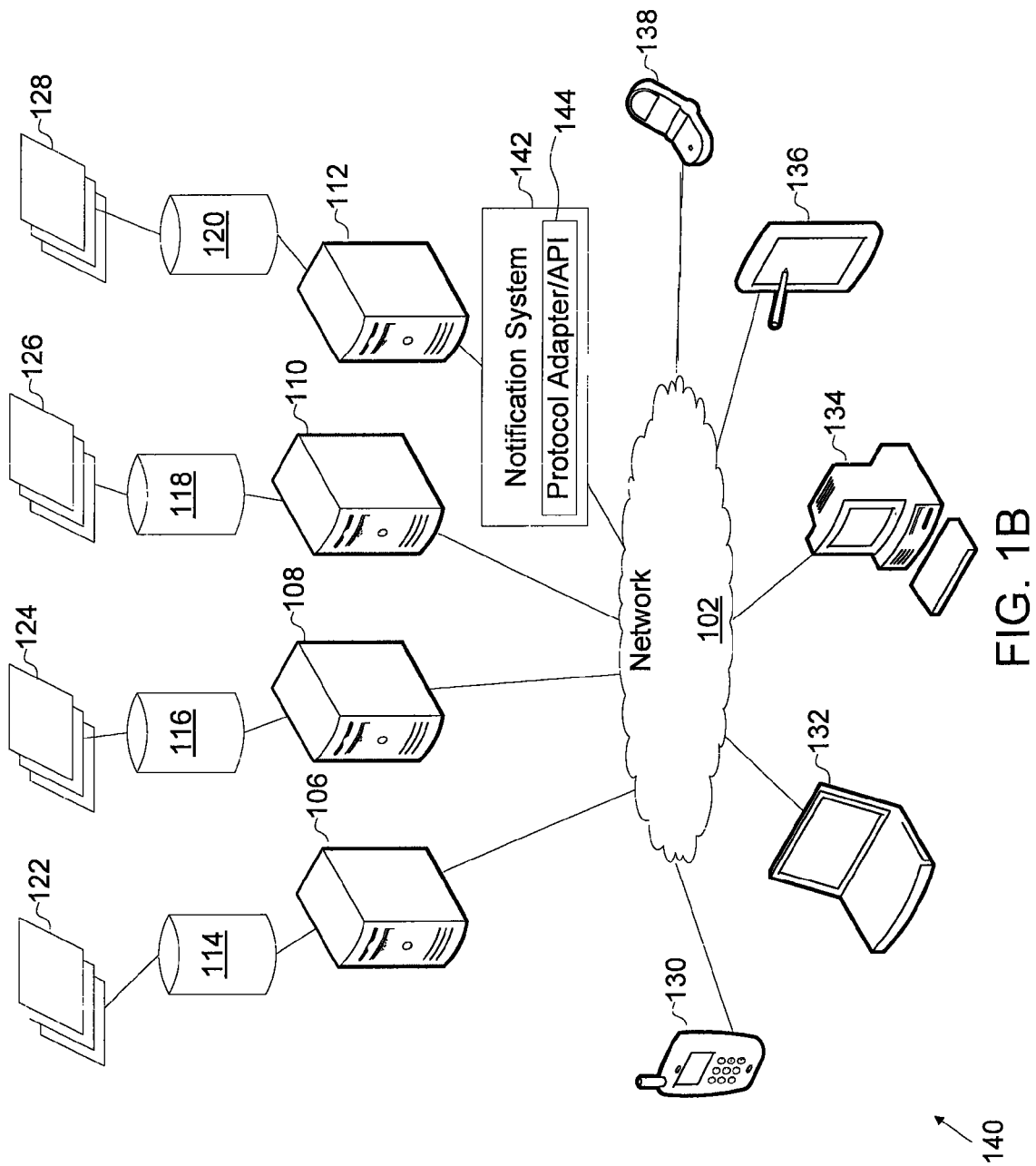
FIG. 1B illustrates another exemplary persistent synthetic environment message notification system.

FIG. 1B illustrates another exemplary persistent synthetic environment message notification system. Here, system 140 includes network 102, servers 106-112, databases 114-120, data 122-128, end devices 130-138, and message notification system 142 (including protocol adapter/API 144). In some examples, system 140 and the elements shown may be implemented similarly or substantially similarly to those shown and described above in connection with FIG. 1A. As an example, message notification system 142 and protocol adapter/API 144 may be implemented on a single server, for example, such as server 112. Further, protocol adapter/API 144, as shown here or in FIG. 1A, may include one or more applications, programs, or scripts configured to transform or convert data 128, for example, to one or more output formats ("formats") that may be received by applications installed on end devices 130-138. As an example, if a user wishes to implement an RSS-feed associated with events that the user's character is experiencing within a synthetic environment, he can specify one or more inputs (e.g., preferences, filters, rules, parameters, or the like) to message notification system 140 using end device 134. Using network 102, which may be any type of data network (e.g., the Internet, a local area network (LAN), a wide area network (WAN), a wireless local area network (WLAN), or any other type or topology of network), input from end device 134 may be transmitted to message notification system 142 and used to direct the transformation or conversion of data 128 into an RSS-feed that may be received by one or more of end devices 130-132 or 136-138. In some examples, a receiving end device (e.g., end devices 130-138) may be configured or have an application, script, or program installed in order to handle received content formatted using RSS, Atom, or other content syndication formats. In other examples, system 100 and the above-described elements, including notification system 142 and protocol adapter/API 144 may be implemented using a different topology or network configuration apart from that shown and described. Further, system 100 and the above-described elements may be implemented differently and are not limited to the functions, designs, layout, features, attributes, or other aspects as shown and described above.

Figure 1C:
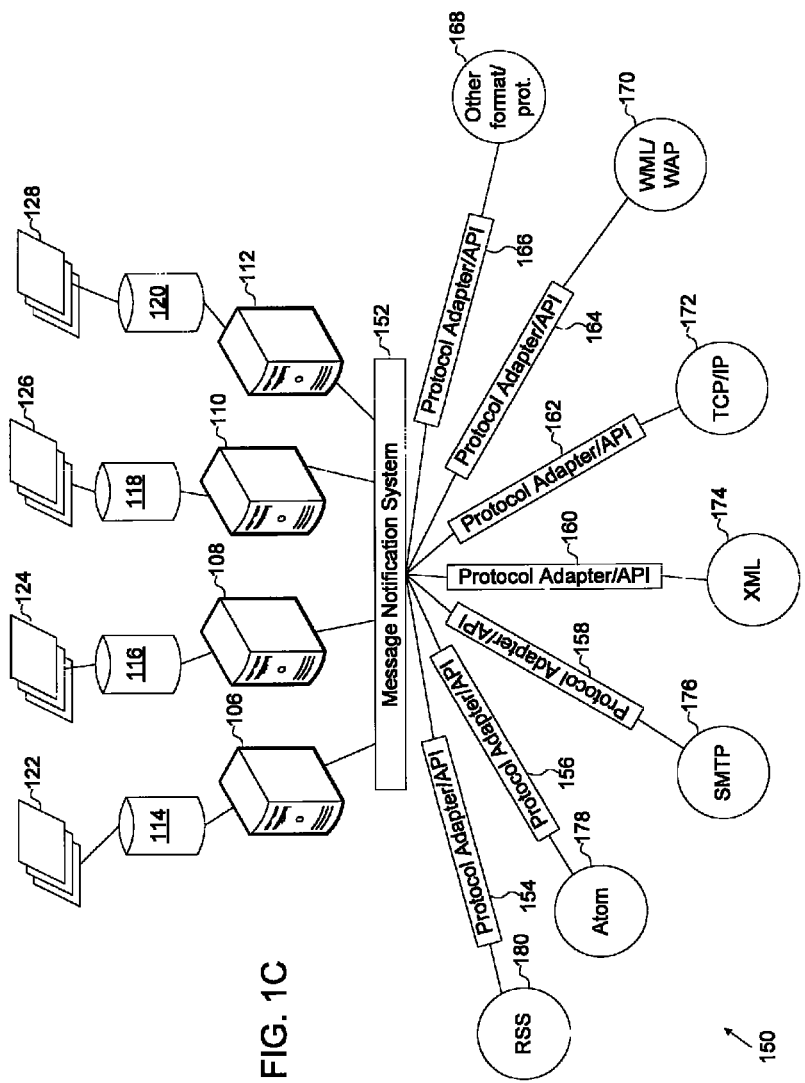
FIG. 1C illustrates yet another exemplary persistent synthetic environment message notification system.

FIG. 1C illustrates yet another exemplary persistent synthetic environment message notification system. Here, system 150 includes servers 106-112, databases 114-120 configured to store and access data 122-128, message notification system 152, and protocol adapters/API 154-166 configured to transform (i.e., convert, format, and the like) data 122-128 into one or more of data formats 168-180. Data formats 168-180 are provided as examples and are not intended to be a comprehensive or all-inclusive set of formats, protocols, and other data types that may be used to generate messages using the techniques described herein. As an example, data 122 may be data and/or information associated with a synthetic environment, a character account used in connection with the synthetic environment, or other related data. When retrieved by server 106 from database 114, data 122 may be used to generate a message by message notification system 152 into an RSS-feed (i.e., data format 180) using protocol adapter/API 154. In some examples, protocol adapters/APIs 154-166 may be interfaces that are used to transform, convert, generate, render, or otherwise process data from one format (i.e., data 122-128) into one or more output formats (e.g., data formats 168-180). Data formats 178-180 may be used to generate messages or a "feed" of data or information associated with a synthetic environment in a form such as a "news ticker," blog post, and others. Data format 176 may be used to provide a message notification as an email that may be sent and interpreted by various types of email applications, including web-based email applications. Further, data formats 172-174 may be used to generate messages for receipt and handling by web-based application or other applications that are used to communicate over, say, the Internet or other types of data networks. Further, data network 170 may be a type of output data format that is used for generating messages or providing real-time dynamic content from a synthetic environment to a mobile web client (e.g., mobile smart phone with an installed web browser, PDA, or the like) using, for example, wireless markup language (WML), wireless application protocol (WAP), binary run-time environment for wireless (Brew®), and the like. Still further, data format 168 may be used to generate messages in other types of data formats apart from those shown and described. Using message notification system 152, which may be implemented on one or more of servers 106-112, real-time, dynamic content (i.e., data 122-128) may be retrieved from one, some, or all of databases 114-120 and provided to end devices 130-138 (FIGS. 1A-1C) using the formats as shown below. Further, message notification system 152 provides logic that may include rules, filters, preferences, parameters, or other attributes that may be user or system-specified for a given character account ("account") to generate messages for transmission to, say, other members of a guild using various types of formats (e.g., email, web, RSS or Atom feeds, mobile web, and others). This provides real-time updating and informing of events and activities occurring within a synthetic environment, regardless of whether the receiving user is logged into the synthetic environment. In other words, users do not need to be logged into the game, synthetic environment, or other types of accounts in order to view dynamic content. In other examples, users may also configure character accounts by inputting rules, filters, preferences, parameters, or other attributes in order to receive data or information associated with her character, regardless of whether she is logged in or out of her account. In still other examples, system 150 and the above-described elements may be varied in quantity, function, configuration, layout, design, operation, implementation, or other aspects and are not limited to the examples shown and described.

Figure 2:
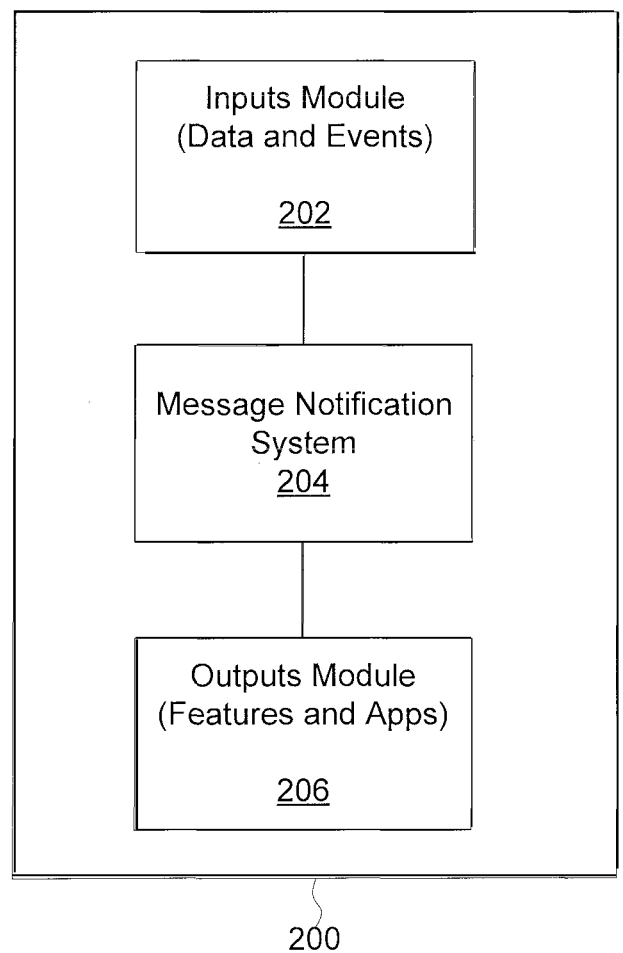
FIG. 2 illustrates an exemplary application architecture for persistent synthetic environment message notification.

FIG. 2 illustrates an exemplary application architecture for persistent synthetic environment message notification. Here, application 200 includes inputs module 202, message notification system 204, and outputs module 206. Each of inputs module 202, message notification system 204, and outputs module 206 may be implemented as a computer program, application, software, hardware, circuitry, or a combination thereof. Further, inputs module 202, message notification system 204, and outputs module 206 may also be portions of software code that are discretely identified here for purposes of explanation. In some examples, inputs module 202 may be an application, program, or script that is used to identify, determine, and encode data input to message notification system 204. Further, outputs module 206 may be an application, program, or script that is used to identify, determine, and transmit messages generated by message notification system 204 using data provided by inputs module 202. Application 200 and the above-described modules may be implemented as software, hardware, circuitry, or a combination thereof and are not limited to the features, functions, configuration, implementation, or structures described above.

Figure 3:
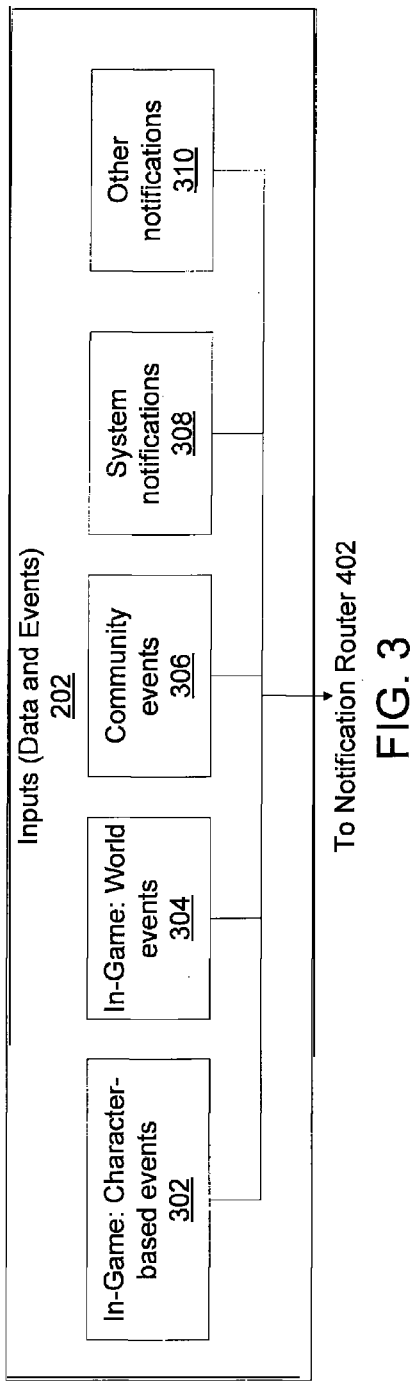
FIG. 3 illustrates exemplary inputs for persistent synthetic environment message notification.

FIG. 3 illustrates exemplary inputs for persistent synthetic environment message notification. Here, inputs module 202 (FIG. 2) includes in-game: character-based events module 302, in-game: world events module 304, community events module 306, system notifications module 308, and other notifications module 310. The quantity, type, configuration, function, structure, or implementation of inputs module 202 and the described elements may be varied and are not limited to the examples shown. In some examples, in-game: character-based events module 302 and in-game: world events module 304 may include processes and data that are used to provide inputs to message notification system 204 (FIG. 2). As an example, in game: character-based events module 302 may be a process implemented using software, hardware, circuitry, or a combination thereof that provides dynamic content associated with characters within a synthetic environment (i.e., character data). Character data may be accessed and retrieved in the form of real-time data to message notification system 204, which is used to generate messages that are directed to outputs module 206 (FIG. 2). In some examples, character data may refer to any type of data or information associated with a character in a synthetic environment. For example, name, physical characteristics (e.g., height, weight, body geometry, hair color, or other dimensions of an avatar associated with a character), wealth, weapon inventory/status, health, and others, without limitation, may be included as character data. Here, when an event occurs within a synthetic environment that affects a character (e.g., character purchases a weapon, character dies, character is injured, character movement occurs, and others), data associated with the event may be provided by in-game: character-based events module 302 to notification system 204 (FIG. 2).

Likewise, in-game: world events module 304 may be implemented as part of inputs module and configured to provide data associated with an event occurring in a synthetic environment (i.e., virtual world) to notification system 204. Events affecting a synthetic environment (e.g., a battle occurring in a given region of a synthetic environment, sunset, sunrise, or any other type of event that may bear general or specific interest for a user) may be provided by in-game: world events module 304. In some examples, community events module 306 may be implemented and configured to provide data or information associated with a friends or guild list, news list, guild news, or news, data, or information associated with game play or a character or a synthetic environment in general. Further, system notifications module 308 may be implemented and configured to provide data or information associated with a character account (e.g., impending account expiration, forgotten or incorrect password, maintenance messages, or other messages generally related to a synthetic environment (i.e., game system, virtual world, and the like)). Still further, other notifications module 310 may be implemented and configured to provide data or information that may be included in messages generated by message notification system 204 (FIG. 2) such as messages from third-party applications other than a game system or platform implementing a synthetic environment. As an example, servers 106-112, databases 114-120, and notification system 104/140 with protocol adapter/API 105/142 (FIG. 1A-1B) may be a game system or platform that is configured to implement a synthetic environment. As an example of other notifications that may be provided by other notifications module 310, third party applications such as online social networking websites may generate messages associated with a character's account and, using the techniques described herein, be included with messages that are generated by message notification system 204. Data gathered, filtered, and sent by modules 302-310 may be generated from a variety of sources in real-time or substantially real-time and, once identified based on preferences, rules, filters, or other parameters specified within an account, sent to message notification system 204. In other examples, the above-described inputs module 202 and modules 302-310 may be implemented differently and are not limited to the number, type, configuration, implementation, function, design, layout, architecture, or other aspects of the examples shown and described.

Figure 4:
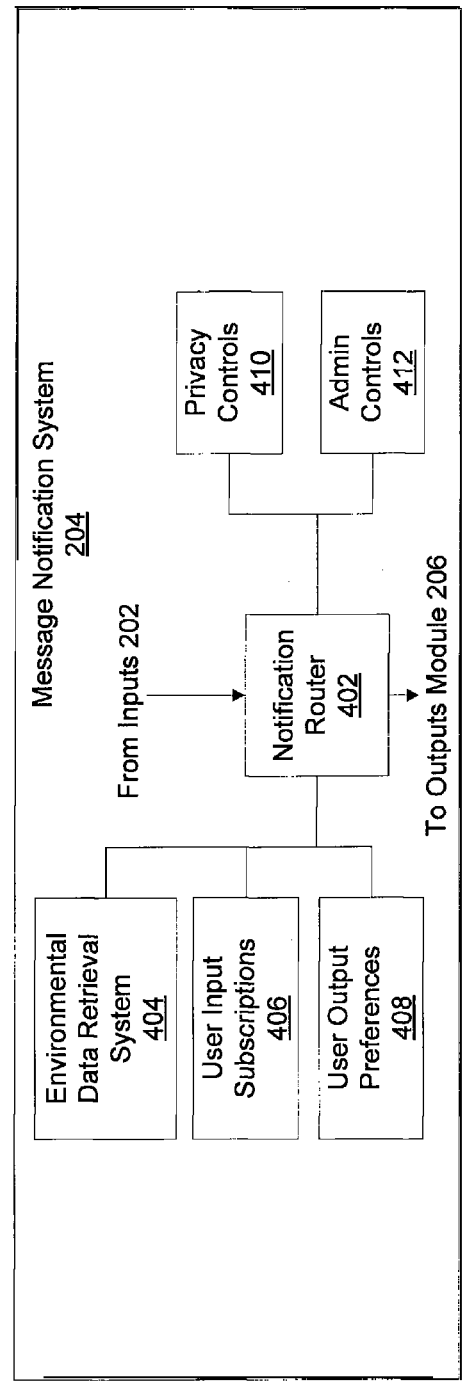
FIG. 4 illustrates an exemplary message notification system for persistent synthetic environment message notification.

FIG. 4 illustrates an exemplary message notification system for persistent synthetic environment message notification. Here, message notification system 204 (FIG. 2) includes notification router 402, environmental data retrieval system 404, user input subscriptions module 406, user output preferences module 408, privacy controls 410, and admin controls 412. Message notification system 204 includes notification router 402, environmental data retrieval system 404, user input subscriptions module 406, user output preferences module 408, privacy controls 410, and admin controls 412 and may be implemented as software, hardware, circuitry, or a combination thereof. Further, one or more of message notification system 204 includes notification router 402, environmental data retrieval system 404, user input subscriptions module 406, user output preferences module 408, privacy controls 410, and admin controls 412 may be implemented as a standalone computer program, software, or application ("application") or as functionality included within another application. Regardless, the described techniques provide functionality that may be implemented by message notification system 204.

In some examples, notification router 402 provides logic configured to control routing of data and the generation of messages (i.e., message notifications) using data or information from inputs module 202, directing the routing of the messages to end devices (e.g., end devices 130-138 (FIGS. 1A-1B) using formatting provided by protocol adapter/APIs in outputs module 206. In other words, notification router 402 provides control signals and instructions that direct the operation of environmental data retrieval system 404, user input subscriptions module 406, and user output preferences module 408 to generate messages based on privacy controls 410 and admin controls 412, for output by outputs module 206, as described in greater detail below in connection with FIG. 5. Further, notification router 402 may be implemented as logic configured to determine what data or information associated with a synthetic environment, character, character account, or the like is sent and the manner (e.g., how messages are generated for a given output format or media) in which the data or information is sent. In some examples, notification router 402 may include a set of rules that are configured as a rules-based logic engine for message notification system 204. In other examples, notification router 402 may be implemented as a data switch that is configured to interact with user input subscriptions module 406 to retrieve or send synthetic environment (e.g., game) data to in and out-of-game destinations. In still other examples, notification router 402 may be implemented differently.

Here, environmental data retrieval system 404 may be implemented to provide a software-based mechanism, in some examples, for retrieving data or information from a synthetic environment. For example, data associated with world-based events (e.g., environmental conditions, events, activities, or other occurrences) may be retrieved by environmental data retrieval system 404 and sent to notification router 402 for inclusion with a message generated by the latter and forwarded to outputs module 206 (FIG. 2). Environmental data retrieval system 404 may also retrieve any type of data or information associated with a synthetic environment such as a virtual world, game environment, game system, or the like, regardless of implementation (e.g., shards, server-based, client-server, client installed, and others). Information such as time, date, place, and other environmental characteristics may be provided by environmental data retrieval system 404 to notification router 402 or other elements, as shown.

In some examples, users may provide various types of input (e.g., preferences, rules, parameters, filters, privacy options, administrative controls, and others) using user input subscriptions module 406, user output preferences module 408, privacy controls 410, and admin controls 410. For example, user input subscriptions module 406 may be implemented and used to identify what types and sources of information a user wishes to have accessed for generating messages by message notification system 204. As an example, a user may want to specify (i.e., using user input subscriptions module 406) that data or information associated with her character, a game, world events, and others is accessed and used by notification router 402 to generate messages. As another example, user output preferences module 408 may be configured to identify output formats, including delivery media (e.g., email, instant messages, in-game notifications, out-of-game notifications (e.g., email, instant messages, emails including hyperlinks ("links")) to web-based media (e.g., animation clips or segments, for example, of a battle in which a character fought)) for delivering or receiving data or information associated with a synthetic environment. Privacy controls 410 may, in some examples, be implemented to allow the entry of rules or filters that prevent data or information from being sent to undesirable recipients or end devices (e.g., end devices 130-138 (FIGS. 1A-1B)). Privacy controls 410 may also be implemented to control how messages are sent, preventing unauthorized access to sensitive data such as account information, payment information, user profile information, and the like. Admin controls 412 may, in some examples, include instructions or other features that enable users to direct the establishment, use, access, authentication, or other aspects of an account associated with a synthetic environment. In other examples, notification router 402, environmental data retrieval system 404, user input subscriptions module 406, user output preferences module 408, privacy controls 410, and admin controls 412 may be implemented differently than as shown and described.

As an example of the functionality and features provided by implementing the above-described elements, a user may be interacting with a historical role playing first-person-shooter ("FPS") or role-playing game ("RPG") implemented using a synthetic environment configured to appear as South Africa in 1879. In this example, a user's character may have an avatar that appears as a British soldier in Company B, the $24^{th}$ Regiment of Foot, which is combating a Zulu warrior at the defense of Rorke's Drift. During her game play (i.e., interaction with the synthetic environment), a user may wish to share her "experience" with other users who are either currently logged into the game (i.e., "in-game") or logged out of the game (i.e., "out-of-game"), including data or information regarding her character, her character's ammunition inventory, weapons status, an animation segment showing a given scene in the battle, or the like. Environmental data retrieval system 404 may be used to access and send data associated with the character's game play to notification router 402. As an example of in-game data or information that may be shared, the user may be coordinating with other users (i.e., friends, members of the same unit, guild, or other type of group). In-game shared data or information may include, in this example, her weapons and unit status indicating that the user is running low on ammunition and about to be overrun, providing a pop-up window to another user in a different region of the synthetic environment who is part of a relief column. As an example of out-of-game shared data or information, a user may email an animation clip or segment or a link to an animation clip or segment that allows another user who is not logged into the game to view the former's experience, which could result in the other user joining the game to bring his character to the rescue of the beleaguered user. In other examples, different in-game and out-of game messages may be generated and are not limited to the examples described above. User input subscriptions module 406 may be configured to allow message notification system to provide data or information from a weapons database, character health database, and game play database. Using output preferences provided by user output preferences module 408, notification router 402 generates messages formatted in SMTP for email and WAP/WML for mobile end devices (e.g., smart phones, PDAs, mobile phones, and the like). Further, privacy controls module 410 and admin controls module 412 indicate that data or information associated with the given user should only be sent to members of her guild. Thus, messages are generated that indicate the user's plight within the synthetic environment are sent to trusted recipients (i.e., members of the user's guild), regardless of whether logged into the game or out of the game. As another example, a user may be participating in an auction or other type of marketplace within a synthetic environment (e.g., bidding on a given item). By indicating preferences for receiving information related to the auction using user input subscriptions module 406 and generating email messages to the user's email account using user output preferences module 408, the user may receive one or more intermittent or continuous emails regarding the status of the auction and, in some examples, receive opportunities to direct her character's actions within the synthetic environment while not in-game. The above-described examples may be varied further and are not limited to the descriptions provided. Still further, notification system 204 and the above-described elements may be varied in design, function, limitation, operation, configuration, or implementation and are not limited to those provided.

Figure 5:
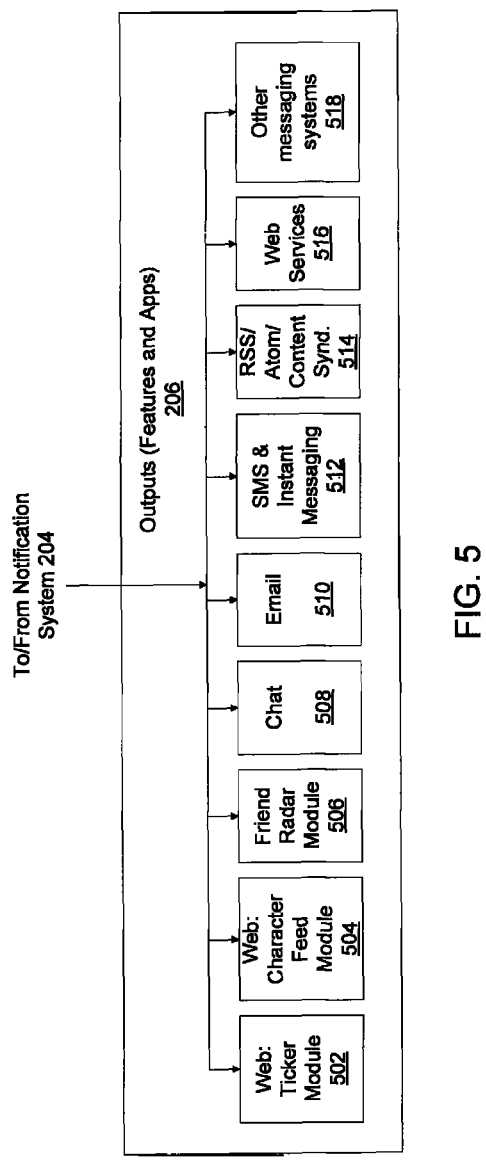
FIG. 5 illustrates exemplary outputs for persistent synthetic environment message notification.

FIG. 5 illustrates exemplary outputs for persistent synthetic environment message notification. Here, outputs module 206 includes web ticker module 502, web character feed module 504, friend radar module 506, chat module 508, email module 510, SMS and instant messaging module 512, RSS/Atom/content syndication module 514, web services module 516, and other messaging systems module 518. In some examples, outputs module 206 may receive message data (i.e., data or information retrieved from databases or other sources associated with a synthetic environment and configured for use with messages generated by message notification system 204) and configure messages into one or more output formats using any of web ticker module 502, web character feed module 504, friend radar module 506, chat module 508, email module 510, SMS and instant messaging module 512, RSS/Atom/content syndication module 514, web services module 516, and other messaging systems module 518. Web ticker module 502 may be used to implement a "news ticker" feed for providing data or information associated with a synthetic environment, game play, or the like. As an example, web-based data may be formatted using markup languages such as XML, HTML, and others, but sent using TCP/IP as a data communication protocol for interpreting and handling data packets including a given message. Likewise, web character feed module 504 may be implemented to enable a feed that appears similarly or substantially similar to that described above for web ticker module 502. In some examples, a character feed may be provided by web character feed module 504, which may be implemented as a news ticker appearing on a website associated with a given user. For example, a character feed may be implemented on a personal web page of a social networking site, allowing others outside of the synthetic environment to view or observe real-time activity of a given character. Likewise, a character for one user may be transmitted and rendered on the website of another user, allowing users to view each other's activities. In other examples, a character feed may be implemented within the synthetic environment (i.e., in-game), allowing users to observe other users' activities during game play. As an example, a character-based update or feed ("character feed") may be manually, automatically, or semi-automatically "pushed" (i.e., sent without permission or input from the receiving user) or "pulled" (i.e., requested by another user) to users listed on a "friend's list" or guild list. As another output format, friend radar module 506 may be implemented that provides data or information to a given user's friends (e.g., other members of a guild, team, or other unit or group) associated with the user or her friend's activities, events, occurrences, or other interactions within a synthetic environment, regardless of whether the user or her friends are logged into (i.e., accessing) the synthetic environment. Chat module 508 may be implemented to enable messages to be generated and sent using various types of chat formats and data protocols (e.g., IRC, synchronous conferencing, XMPP (i.e., extensible messaging and presence protocol), VoIP, or other types of real-time or near real-time text or voice-based communication applications, formats, and protocols). Email module 510 may be used to generate messages that are sent using various types of email communication protocol formats, including, but not limited, to SMTP, POP, IMAP, and others. SMS (i.e., short messaging service) and instant messaging ("IM") module 512 may be implemented for generating messages that are sent using SMS, a text-based form of data communication, or instant messages to other users, in-game or out-of-game. RSS, Atom, and content syndication module 514 may be used to "feed" or send and post data to another application having a reader (i.e., an application or API configured to receive, interpret, or otherwise process data formatted according to various content syndication formats such as RSS or Atom), such as a blog website ("blog") or the like. Further, data or information may be sent as part of messages communicated using one or more web services. Thus, web services module 516 may be used to generate messages that are communicated over a web service. Further, other output formats may be implemented using other messaging systems 518. The above-described techniques allow data or information associated with a synthetic environment to be shared or communicated to recipients, in-game or out-of-game. Still further, outputs module 206 and the above-described elements are not limited to the examples shown and described.

Figure 6:
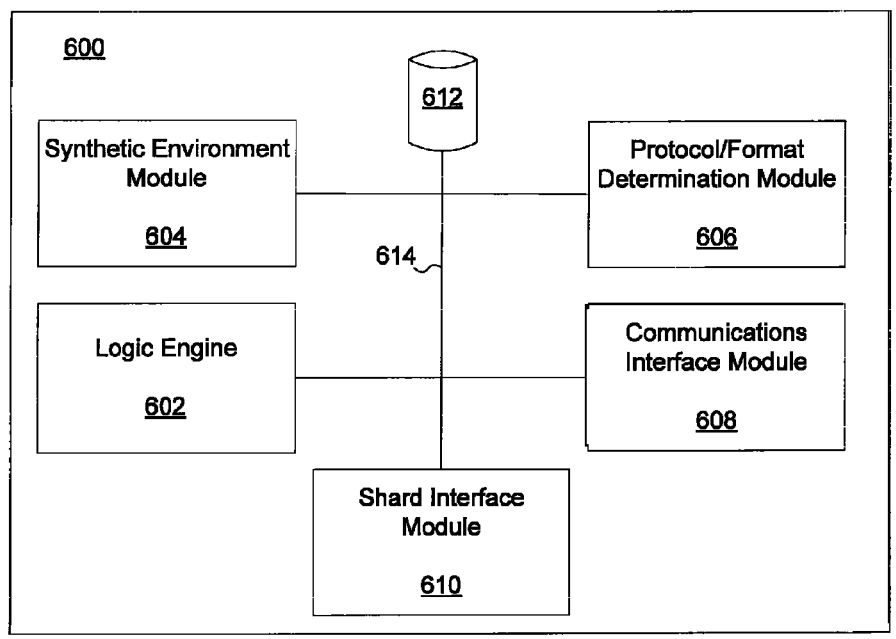
FIG. 6 illustrates an alternative exemplary application architecture for persistent synthetic environment message notification.

FIG. 6 illustrates an alternative exemplary application architecture for persistent synthetic environment message notification. Here, application 600 includes logic engine 602, synthetic environment module 604, protocol/format determination module 606, communications interface module 608, shard interface module 610, and database 612. In some examples, logic engine 602 may be implemented to generate and provide control signals and instructions to synthetic environment module 604, protocol/format determination module 606, communications interface module 608, shard interface module 610, and database 612 in order to generate messages including data or information associated with a synthetic environment. Retrieval and initial processing (e.g., selecting data from sources (e.g., database 612) indicated by user preferences, filtering data or information to be output based on output preferences specified by a user, which may be included as part of logic engine 602 or synthetic environment module 604) of data or information may be performed by synthetic environment module 604. Types of data or information retrieved by synthetic environment module 604 may include time, date, status of specific regions (e.g., disease-stricken, war-torn, impoverished, prosperous, economically depressed, and the like), physical characteristics of a synthetic environment (e.g., plains, mountainous, desert, barren, hilly, wooded, urban, suburban, and others), and others.

Here, protocol/format determination module 606 may be configured to determine indicated output formats based on user preferences. Cooperatively working with logic engine 602 using data bus 614 (i.e., one or more direct or indirect connections that enable data communication between the elements shown in application 600), messages may be generated and output using communications interface module 608 and shard interface module 610. In some examples, communications interface module 608 allows communication of data and information from message notification application 600 to other application, operating systems, computing environments, or the like. Further, shard interface module 610 may, in some examples, be implemented to allow data or information to be retrieved from or sent as messages to one or more shards, without limitation. Database 612 may be a single or multiple databases, data marts, data warehouses, storage area networks ("SAN"), or other type of data storage retention facility that is configured to store and access data associated with messages, data communication protocols, application programming interfaces, and others. In some examples, database 612 may be implemented using one or more databases, game databases, data warehouses, or others to provide a primary source of synthetic environmental data (e.g., data provided from a game database), aggregated sources of synthetic environmental data (e.g., data provided using a data warehouse), or to queue and temporarily store messages that are not delivered, transmitted, or explicitly stored by message notification system (e.g., message notification system 104 (FIG. 1A), 142 (FIG. 1B), 152 (FIG. 1C), or the like) for subsequent delivery or retrieval. With regard to explicit storage by message notification system 104 (FIG. 1A), 142 (FIG. 1B), 152 (FIG. 1C), or the like for subsequent delivery or retrieval, as an example, an event occurring within a synthetic environment may generated synthetic environmental data that is received by message notification system 104 (FIG. 1A), 142 (FIG. 1B), 152 (FIG. 1C), or the like, but stored instead of being delivered. Conditions that may result in storage of synthetic environmental data for later retrieval and delivery may include user or system-specified parameters that instruct application 600 to store rather than deliver synthetic environmental data, a destination or recipient being unavailable, an event is delayed that does not require delivery of the synthetic environmental data immediately (e.g., an event within the synthetic environment that is scheduled to occur at some future date and time), and others. In other words, synthetic environmental data may be retrieved from database 612 or directly from a synthetic environment. In other examples, application 600 and the above-described elements may be varied in design, function, layout, configuration, implementation, structure, application architecture, or other aspects, without limitation to the examples shown and described above.

Figure 7:
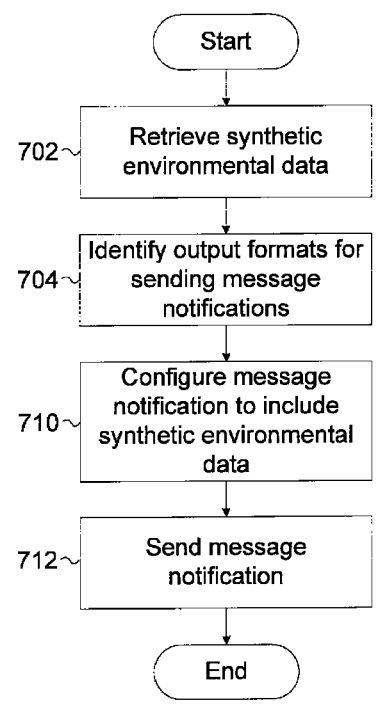
FIG. 7 illustrates an exemplary process for persistent synthetic environment message notification.

FIG. 7 illustrates an exemplary process for persistent synthetic environment message notification. Here, synthetic environmental data is retrieved (702). Once retrieved, preferences, filters, rules, or other user or system-specified parameters are evaluated to identify output formats for generated messages including synthetic environment data (704). A message notification (i.e., message) is configured using the retrieved synthetic environmental data (e.g., any data that meets one or more criteria specified by a user, system, or a combination thereof, that, when the criteria are met, is to be sent as a message to one or more end devices (e.g., end devices 130-138 (FIGS. 1A-1B)) (710). Once generated, a message notification may be sent (712). In other examples, the above-described process may be varied and is not limited to the techniques provided. The above-described process may be varied in order, function, processes, steps, or other aspects and are not limited to the examples shown and described.

Figure 8:
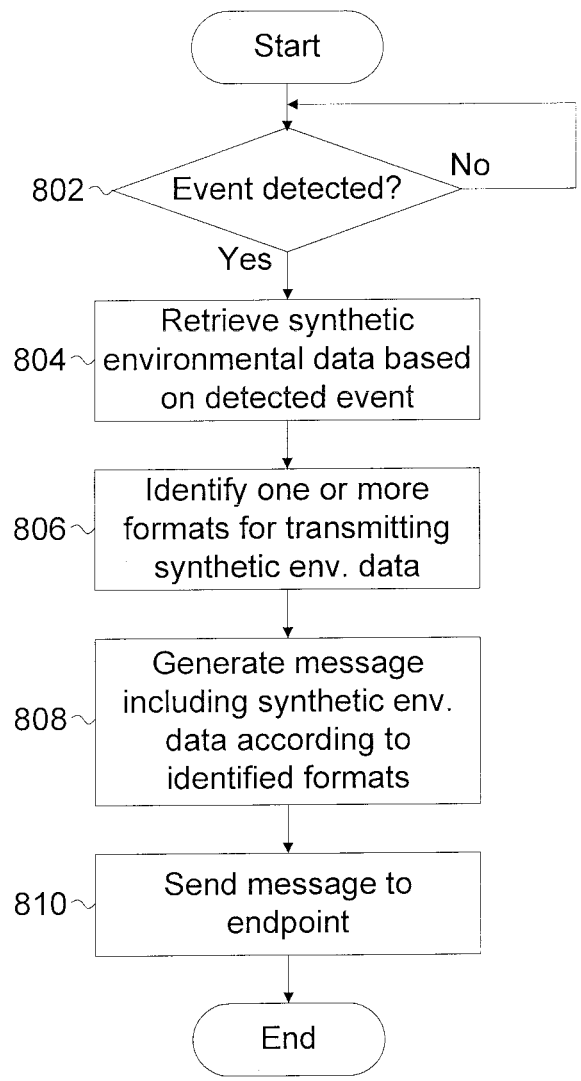
FIG. 8 illustrates an alternative exemplary process for persistent synthetic environment message notification.

FIG. 8 illustrates an alternative exemplary process for persistent synthetic environment message notification. Here, a determination is made as to whether an event has been detected (802). If an event is not detected, the system or application (e.g., message notification system 204 (FIG. 2)) waits until an event is detected. If an event is detected, then synthetic environmental data is retrieved based on the detected event (804). Once retrieved, one or more output formats are identified for transmitting the synthetic environmental data as a message to one or more in-game or out-of-game recipients (e.g., end devices 130-138 (FIGS. 1A-1B)) (806). Once identified, the one or more output formats are used to generate one or more messages communicating the synthetic environmental data (808). Once generated, messages are sent to endpoints (e.g., end devices 130-138) indicated by preferences specified by a user, system, or a combination thereof. In other examples, the above-described examples may be varied and are not limited to the techniques described. The above-described process may be varied in order, function, processes, steps, or other aspects and are not limited to the examples shown and described.

Figure 9A:
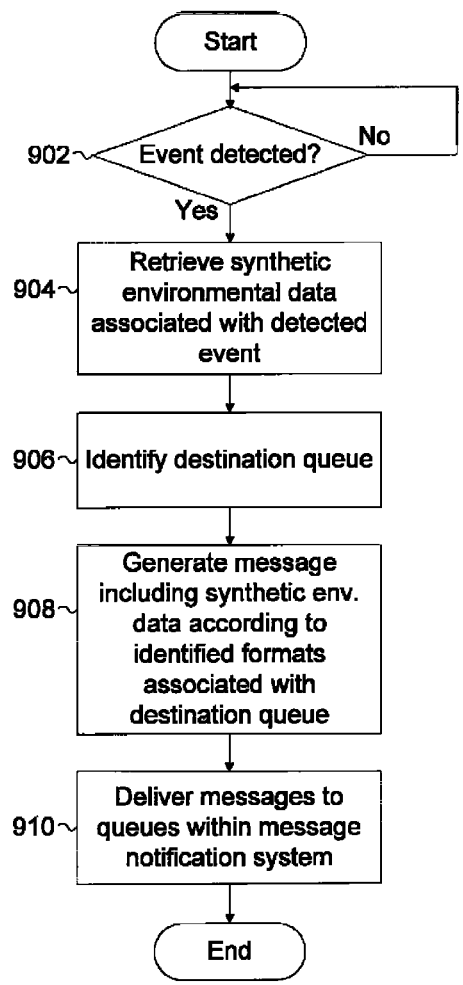
FIG. 9A illustrates an exemplary process for providing a message using an exemplary message notification system.

FIG. 9A illustrates an exemplary process for providing a message using an exemplary message notification system. Here, an event loop is performed in order to make a determination as to whether an event (i.e., an event occurring within or affecting the synthetic environment, such as a user input, a battle, character or avatar interaction, and others) has been detected (902). If an event is not detected, a loop is performed until an event is detected. If an event is detected, synthetic environmental data associated with the detected event is retrieved from, for example, database 612 (FIG. 6), a synthetic environment, or another source (904). Once retrieved, a destination queue is identified (906). In some example, a destination queue may be a list, table, or other data structure that is used to hold messages sent from message notification system 104 (FIG. 1A), 142 (FIG. 1B), 152 (FIG. 1C), or the like to await further processing (e.g., generating and formatting a message for delivery to an end device (e.g., cell phone, smart phone, PDA, or the like). After identifying a destination queue, a message may be generated, including providing synthetic environmental data with the message and based on one or more formats associated with the identified destination queue(s) (908). Once generated, a message may be delivered to a queue within message notification system (FIG. 1A), 142 (FIG. 1B), 152 (FIG. 1C), or the like (910). In other examples, the above-described process may be "chained" or repeated for multiple layers of queues. In other words, if multiple queues are identified having similar or different formats, the above-described processes may be chained or sequentially performed such that messages are generated for multiple identified queues. In other examples, the above-described process may be varied and is not limited to those shown and described.

Figure 9B:
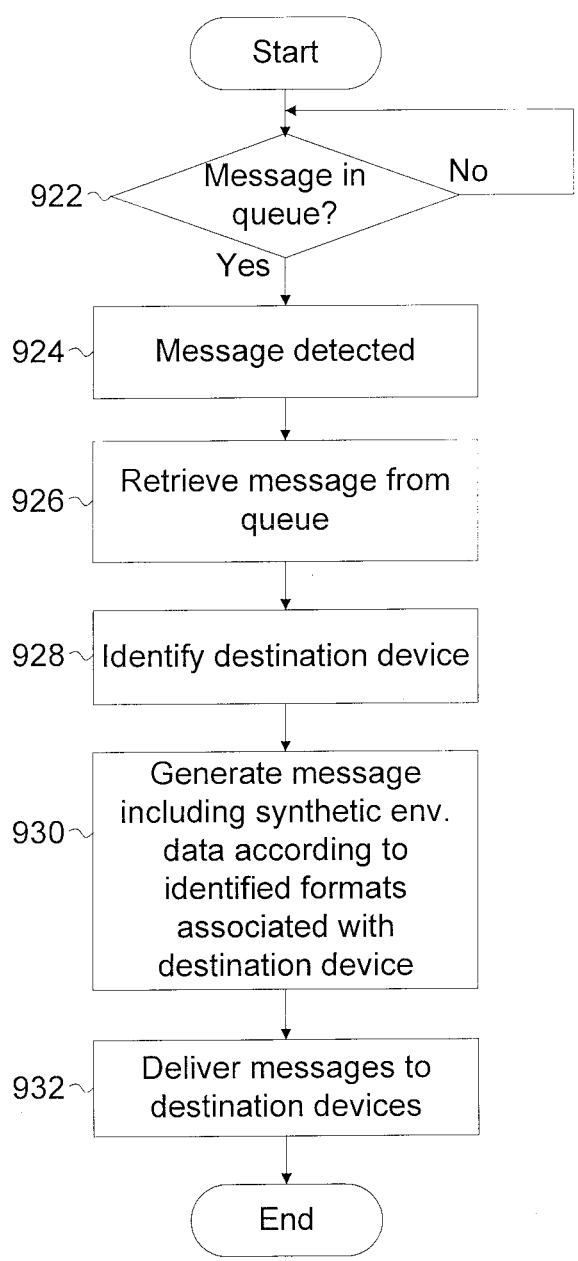
FIG. 9B illustrates another exemplary process for providing a message using an exemplary message notification system.

FIG. 9B illustrates another exemplary process for providing a message using an exemplary message notification system. Here, a loop may be performed to determine whether a message is present in a queue (i.e., destination queue as described above) (922). If a message is not detected in a destination queue, then the loop repeats. Alternatively, if a message is detected (924), then the message is retrieved from the queue (926). Once retrieved, a destination device associated with the queue is identified (928). After identifying the destination device, a message may be generated including the synthetic environmental data using one or more formats associated with the destination device (930). For example, if a smart phone is identified as a destination device and messages are formatted using WAP/WML (i.e., wireless application protocol/wireless markup language), then a message may be generated based on the identified format prior to transmission to the destination device. Alternatively, a destination device may be identified and associated with another format (e.g., HTML (i.e., hypertext markup language), XML (extensible markup language), and others). Once generated, messages may be delivered (i.e., transmitted, sent, or otherwise provided) to a destination device (e.g., cell phone, smart phone, client, server, or others) (932). In other examples, the above-described process may be chained or performed in connection, directly or indirectly, with the process described above or that of FIG. 9A. In other words, the above-described process may be performed for multiple destination devices such that messages are delivered using, for example, message notification system 104 (FIG. 1A), 142 (FIG. 1B), 152 (FIG. 1C). As an example, if multiple destination devices are identified, including a cell phone, smart phone, client computer, and PDA, the above-described process may be chained (i.e., the above-described process may be a "link" in a chain of processes that are performed for multiple destination devices). In still other examples, the above-described process may be varied and are not limited to the examples shown and described above.

Figure 10:
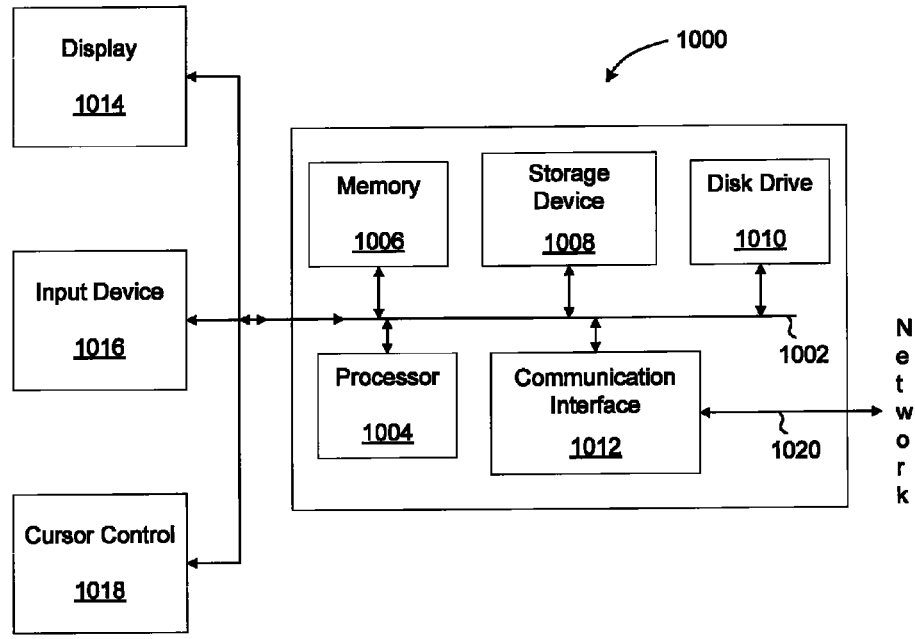
FIG. 10 illustrates an exemplary computer system suitable for persistent synthetic environment message notification.

FIG. 10 illustrates an exemplary computer system suitable for persistent synthetic environment message notification. In some examples, computer system 1000 may be used to implement computer programs, applications, methods, processes, or other software to perform the above-described techniques. Computer system 1000 includes a bus 1002 or other communication mechanism for communicating information, which interconnects subsystems and devices, such as processor 1004, system memory 1006 (e.g., RAM), storage device 1008 (e.g., ROM), disk drive 1010 (e.g., magnetic or optical), communication interface 1012 (e.g., modem or Ethernet card), display 1014 (e.g., CRT or LCD), input device 1016 (e.g., keyboard), and cursor control 1018 (e.g., mouse or trackball).

According to some examples, computer system 1000 performs specific operations by processor 1004 executing one or more sequences of one or more instructions stored in system memory 1006. Such instructions may be read into system memory 1006 from another computer readable medium, such as static storage device 1008 or disk drive 1010. In some examples, hard-wired circuitry may be used in place of or in combination with software instructions for implementation.

The term "computer readable medium" refers to any tangible medium that participates in providing instructions to processor 1004 for execution. Such a medium may take many forms, including but not limited to, non-volatile media and volatile media. Non-volatile media includes, for example, optical or magnetic disks, such as disk drive 1010. Volatile media includes dynamic memory, such as system memory 1006.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1002 for transmitting a computer data signal.

In some examples, execution of the sequences of instructions may be performed by a single computer system 1000. According to some examples, two or more computer systems 1000 coupled by communication link 1020 (e.g., LAN, PSTN, or wireless network) may perform the sequence of instructions in coordination with one another. Computer system 1000 may transmit and receive messages, data, and instructions, including program, i.e., application code, through communication link 1020 and communication interface 1012. Received program code may be executed by processor 1004 as it is received, and/or stored in disk drive 1010, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method, comprising:
retrieving synthetic environmental data at a first device associated with a first player, a first character account, and a first synthetic environment;
identifying one or more output formats associated with the first character account;
configuring a message notification deliverable to a second player associated with the first character account within the first synthetic environment or within a second synthetic environment, wherein the message notification comprises the synthetic environmental data associated with the first synthetic environment and allows the second player to observe real-time activity of the first player in the first synthetic environment;
determining whether the second player is on an approved list;
determining whether the message notification includes sensitive information, the sensitive information including account information, payment information, user profile information, or any combination thereof; and
in the event that the second player is on the approved list and the message notification does not include sensitive information, sending the message notification comprising the synthetic environmental data associated with the first synthetic environment in the one or more output formats to the second player.

2. The method of claim 1, wherein the synthetic environmental data is generated from a platform configured to implement a virtual world.

3. The method of claim 1, wherein the synthetic environmental data is associated with a virtual world.

4. The method of claim 1, wherein the synthetic environmental data is generated from a shard configured to implement at least a portion of a virtual world.

5. The method of claim 1, wherein the first character account is associated with a first avatar and the second character account is associated with a second avatar.

6. The method of claim 1, wherein the one or more output formats comprise a content syndication format.

7. The method of claim 6, wherein the content syndication format is RSS.

8. The method of claim 6, wherein the content syndication format is Atom.

9. The method of claim 1, wherein at least one of the one or more output formats is configured to present data on the World Wide Web.

10. The method of claim 1, wherein at least one of the one or more output formats is configured to send and receive data using a data transmission protocol.

11. The method of claim 10, wherein the data transmission protocol comprises SMTP.

12. The method of claim 10, wherein the data transmission protocol comprises TCP/IP.

13. The method of claim 10, wherein the data transmission protocol comprises UDP.

14. The method of claim 1, wherein configuring the synthetic environmental data is performed by a message notification system.

15. The method of claim 1, wherein configuring the synthetic environmental data comprises configuring the synthetic environmental data to be transmitted to one or more clients.

16. The method of claim 15, wherein the one or more clients comprises a mobile data communication device.

17. The method of claim 15, wherein the one or more clients comprises an application configured to access data from the Internet.

18. The method of claim 15, wherein the one or more clients comprises an electronic mail application.

19. The method of claim 15, wherein the one or more clients comprises an application configured to access the synthetic environment.

20. The method of claim 15, wherein the synthetic environment is a virtual world.

21. The method of claim 1, wherein the first player is within a first shard of the first synthetic environment and the second player is within a second shard of the first synthetic environment and sending further comprises sending the message notification from the first shard the second shard of the first synthetic environment.

22. The method of claim 1, wherein the second player is within the second synthetic environment and the sending further comprises sending the message notification from an arbitrary number of shards within the first synthetic environment to the second player.

23. The method of claim 1, wherein the determining of whether the second player is on the approved list includes:
   determining whether an end device used by the second player is approved; and
   in the event that the end device used by the second player is unapproved, determining that the second player is not on the approved list.

24. The method of claim 1, wherein the second player includes a third player and a fourth player, the third and fourth players receiving the message notification in different output formats.

25. The method of claim 1, wherein the sending of the message notification occurs in the event that a fifth player requests that the second player receive the message notification.

26. The method of claim 1, wherein the sending of the message notification occurs without the second player requesting the message notification.

27. A method, comprising:
   retrieving synthetic environmental data associated with an event occurring within a first synthetic environment at a source device, the event relating to online activities of a first user having a first user account;
   configuring the synthetic environmental data;
   generating a message comprising the configured synthetic environmental data, wherein the message is deliverable a second user in a second synthetic environment and allows the second player to observe real-time activity associated with the first character account in the first synthetic environment;
   determining whether the second user is on an approved list;
   determining whether the message notification includes sensitive information, the sensitive information including account information, payment information, user profile information, or any combination thereof; and
   in the event that the second user is on the approved list and the message notification does not include sensitive information, sending the message comprising the synthetic environmental data to an endpoint device selectable to be within the first synthetic environment and within the second synthetic environment.

28. The method of claim 27, wherein sending the message further comprises transmitting the message across one or more interfaces.

29. The method of claim 27, wherein sending the message further comprises transmitting the message across one or more shards configured to implement the synthetic environment.

30. The method of claim 27, wherein sending the message further comprises transmitting the message across one or more games, wherein the one or more games may be implemented using a platform associated with one or more shards.

31. The method of claim 27, wherein the first synthetic environment and the second synthetic environment are virtual worlds.

32. The method of claim 27, wherein the first synthetic environment and the second synthetic environment are persistent.

33. The method of claim 27, wherein each of the first synthetic environment and the second synthetic environment comprises a persistent virtual world implemented using one or more shards configured to process a function associated with an event occurring within or without the persistent virtual world.

34. A system comprising:
   a memory configured to store data associated with a first player, a first character account, and a first synthetic environment; and
   a logic module configured:
      to retrieve synthetic environmental data associated with the first character account and a first synthetic environment,
      to identify whether a second player associated with the first character account is within the first synthetic environment or within a second synthetic environment,
      to identify one or more output formats associated with the first character account, to select an endpoint within the first synthetic environment if the second player is in the first synthetic environment or an endpoint within the second synthetic environment if the second player in the second synthetic environment,
      to transform the synthetic environmental data into the one or more output formats,
      to determine whether the second player is on an approved list when an event occurs,
      to determine whether the message notification includes sensitive information, the sensitive information including account information, payment information, user profile information, or any combination thereof, and
      in the event that the second player is on the approved list and the message notification does not include sensitive information, to send the synthetic environmental data in the one or more output formats to the endpoint allowing the second player to observe real-time activity associated with the first character account in the first synthetic environment.

35. A message notification system, comprising:
   a memory configured to store data associated with a first synthetic environment; and
   a processor configured:
      to retrieve synthetic environmental data associated with an event occurring within the first synthetic environment, to identify one or more formats to configure the synthetic environmental data and to transmit the synthetic environmental data, to generate a message comprising the synthetic environmental data, the message being generated based on at least one of the one or more formats, to determine whether a player is on an approved list, to determine whether the message notification includes sensitive information, the sensitive information including account information, payment information, user profile information, or any combination thereof, and in the event that the player is on the approved list and the message notification does not include sensitive information, to send the message comprising the synthetic environmental data to an endpoint selectable to be within the first synthetic environment and within a second synthetic environment, and allowing the player to observe real-time activity associated with the first synthetic environment.

36. A computer program product embodied in a non-transitory computer readable medium and comprising computer instructions for:

retrieving synthetic environmental data associated with a first player, a first character account, and a first synthetic environment;

identifying whether a second player associated with the first character account is within or outside the first synthetic environment or within a second synthetic environment;

identifying one or more output formats associated with the first character account;

selecting an endpoint within the first synthetic environment if the second player is in the first synthetic environment, or selecting an endpoint within the second synthetic environment if the second player is in the second synthetic environment;

transforming the synthetic environmental data into the one or more output formats configurable to allow the second player to observe real-time activity associated with the first character account in the first synthetic environment;

determining whether the second player is on an approved list when an event occurs;

determining whether the message notification includes sensitive information, the sensitive information including account information, payment information, user profile information, or any combination thereof; and in the event that the second player is on the approved list and the message notification does not include sensitive information, sending the synthetic environmental data in the one or more output formats to the endpoint.

37. A computer program product embodied in a non-transitory computer readable medium and comprising computer instructions for:

retrieving synthetic environmental data associated with an event occurring within a first synthetic environment, the event relating to online activities of a first user having a first user account;

identifying one or more formats to configure the synthetic environmental data and to transmit the synthetic environmental data;

generating a message comprising the synthetic environmental data, the message being generated based on at least one of the one or more formats and configurable to allow a second user in a second synthetic environment to observe real-time activity associated with the first user account in the first synthetic environment;

determining whether the second user is on an approved list;

determining whether the message notification includes sensitive information, the sensitive information including account information, payment information, user profile information, or any combination thereof; and in the event that the second user is on the approved list and the message notification does not include sensitive information, sending the message comprising the synthetic environmental data to an endpoint selectable to be within the first synthetic environment and within the second synthetic environment.

\* \* \* \* \*